(12) United States Patent
Mishkin

(10) Patent No.: US 6,377,781 B1
(45) Date of Patent: Apr. 23, 2002

(54) METHOD AND APPARATUS FOR PROVIDING SESSIONS FOR COMPUTER-BASED QUIZZES

(75) Inventor: Paul B. Mishkin, Sunnyvale, CA (US)

(73) Assignee: Quia Corporation, Burlingame, CA (US)

( * ) Notice: Subject to any disclaimer, the term of this patent is extended or adjusted under 35 U.S.C. 154(b) by 0 days.

(21) Appl. No.: 09/401,067

(22) Filed: Sep. 22, 1999

(51) Int. Cl.[7] .................................................. G09B 7/00
(52) U.S. Cl. ..................................... 434/350; 434/307 R
(58) Field of Search ................................. 434/322, 323, 434/118, 350

(56) References Cited

U.S. PATENT DOCUMENTS

| | | | | |
|---|---|---|---|---|
| 6,141,528 A | * | 10/2000 | Remschel | 434/350 |
| 6,141,529 A | * | 10/2000 | Remschel | 434/350 |
| 6,149,441 A | * | 11/2000 | Pelligrino et al. | 434/350 |
| 6,155,840 A | * | 12/2000 | Sallette | 434/323 |
| 6,157,808 A | * | 12/2000 | Hollingsworth | 434/350 |
| 6,160,987 A | * | 12/2000 | Ho et al. | 434/350 |
| 6,162,060 A | * | 12/2000 | Richard et al. | 434/118 |
| 6,164,974 A | * | 12/2000 | Carlile et al. | 434/322 |

* cited by examiner

Primary Examiner—Joe H. Cheng
Assistant Examiner—Kathleen M. Christman
(74) Attorney, Agent, or Firm—Park, Vaughan & Fleming LLP

(57) ABSTRACT

One embodiment of the present invention includes a system that provides a session for a quiz on a computer system. The system operates by receiving a request to create a session for the quiz. In response to the request, the system creates the session. This session provides a mechanism through which a selected group of people can take the quiz. The system also associates the session with an owner of the session in order to facilitate channeling results generated by the selected group of people in taking the quiz to the owner of the session. Next, the system makes the session for the quiz available over a network so that the selected group of people can take the quiz from remote nodes on the network. Upon receiving the results from the selected group of people taking the quiz, the system communicates the results to the owner of the session. In one embodiment of the present invention, the owner of the session for the quiz is an educator, and the selected group of people are students of the educator.

33 Claims, 6 Drawing Sheets

QUIZ FILES

HTML FILES (QUIZ PAGE, RESULTS PAGE)

DATA FILE (QUESTIONS, ANSWERS)

SETTINGS FILE (NAME OF QUIZ, DESCRIPTION, # OF QUESTIONS)

DATABASE RECORD (ID #, TITLE, AUTHOR)

SESSION FILES

DATA FILE (SNAPSHOT OF QUIZ DATA FILE)

SETTINGS FILE (NAME OF SESSION, TYPE OF FEEDBACK, AUTHOR)

RESULTS FILE

DATABASE RECORD (ID #, TITLE, AUTHOR)

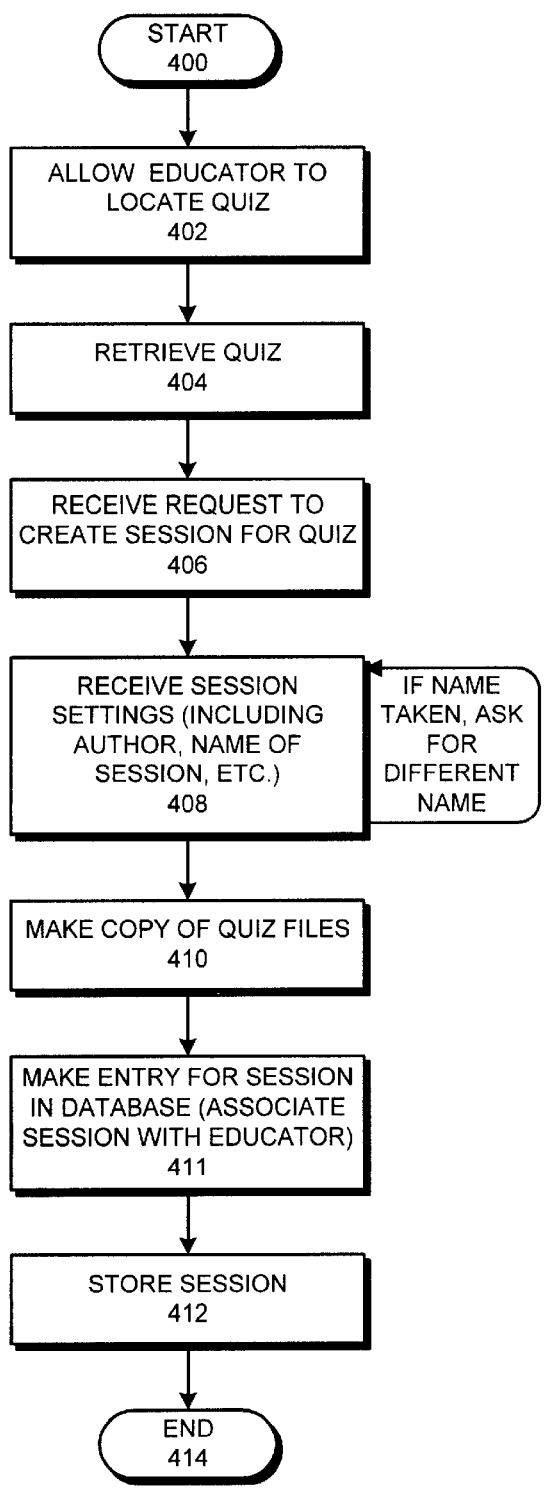
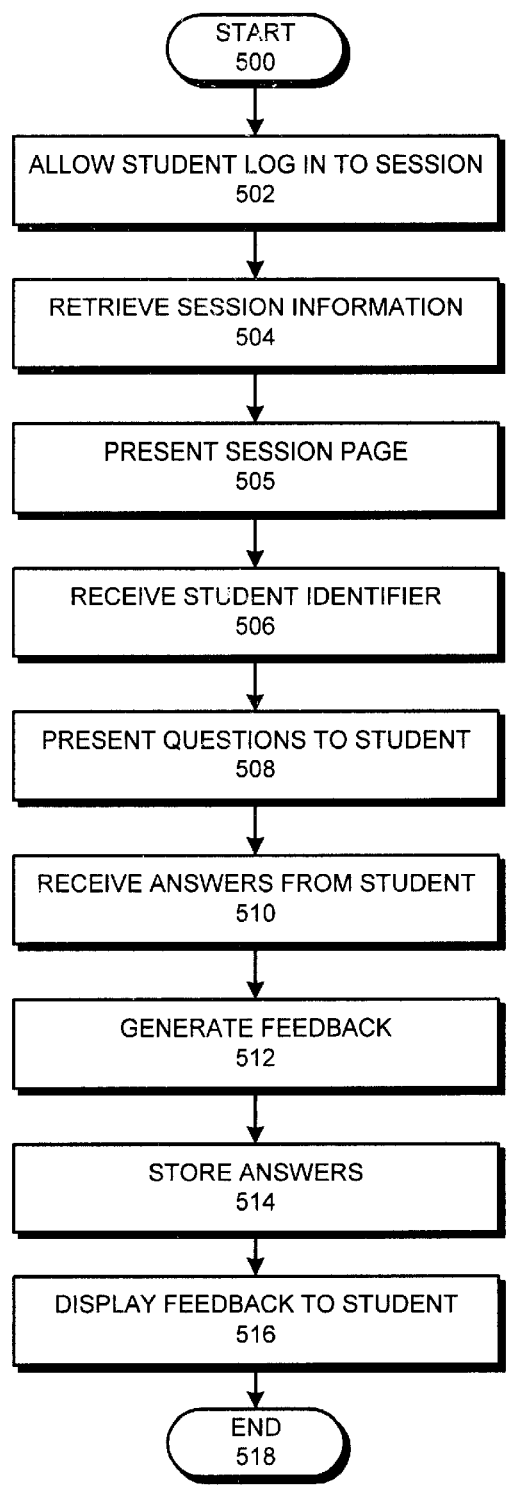
FIG. 4
FIG. 5

METHOD AND APPARATUS FOR PROVIDING SESSIONS FOR COMPUTER-BASED QUIZZES

BACKGROUND

1. Field of the Invention

The present invention relates to quizzes and other types of learning games implemented on computer systems. More particularly, the present invention relates to a method and an apparatus for implementing and manipulating a session for a computer-based quiz.

2. Related Art

The recent proliferation of computer technology has made it possible to automate many tasks involving the manipulation of information. In particular, computers can automate the process of administering educational quizzes and examinations by making a quiz or an examination available on line. This provides a number of advantages.

Making a quiz available on line reduces paperwork by eliminating the time-consuming process of copying the quiz onto sheets of paper to distribute to students. Furthermore, computer technology can automate the process of preparing and formatting the quiz before it is distributed.

Making a quiz available on line can automate the process of scoring student responses to the quiz. Additionally, after a number of quizzes have been scored, computers can automate the process of gathering quiz scores and determining grades for the quiz as well as recording the grades.

Furthermore, making a quiz available on line allows students to more easily take the quiz. If a quiz is made available across a computer network, such as the Internet, it is possible for students to take the quiz from different geographical locations. Making a quiz available on line also allows students to take the quiz at different times.

Unfortunately, existing systems for providing on line quizzes suffer from a number of limitations. Existing systems do not facilitate sharing a quiz between educators so that when an educator expends the effort to create a quiz, the quiz can be used by other educators. In existing systems, the results of all students taking a particular quiz are received by the original author of the quiz. This makes it cumbersome for different educators to use the same quiz.

What is needed is a method and an apparatus that facilitates administering a computer-based quiz to a selected group of people, and channeling the results a particular educator. A system of this type would enable multiple educators to administer the same quiz to different groups of students.

SUMMARY

One embodiment of the present invention includes a system that provides a session for a quiz on a computer system. The system operates by receiving a request to create a session for the quiz. In response to the request, the system creates the session. This session provides a mechanism through which a selected group of people can take the quiz. The system also associates the session with an owner of the session in order to facilitate channeling results generated by the selected group of people in taking the quiz to the owner of the session. Next, the system makes the session for the quiz available over a network so that the selected group of people can take the quiz from remote nodes on the network. Upon receiving the results from the selected group of people taking the quiz, the system communicates the results to the owner of the session.

In one embodiment of the present invention, the owner of the session for the quiz is an educator, and the selected group of people are students of the educator.

In one embodiment of the present invention, the quiz may be associated with a plurality of different sessions owned by a plurality of different session owners.

In one embodiment of the present invention, communicating the results to the owner of the session includes storing the results in a file that can be accessed by the owner of the session. In another embodiment, communicating the results to the owner of the session includes sending the results over the network to the owner of the session.

In one embodiment of the present invention, communicating the results to the owner of the session further comprises formatting the results for display and computing summary statistics for the results.

In one embodiment of the present invention, creating the session for the quiz includes copying questions and answers for the quiz.

In one embodiment of the present invention, making the session for the quiz available over the network includes making the session for the quiz available on a web site on the Internet.

Another embodiment of the present invention provides a data structure encoded in a computer-readable storage medium for providing a session for a quiz. This data structure includes a quiz store for storing questions and answers that make up the quiz. It also includes an access structure for the session that allows a selected group of people to access the session. The data structure additionally includes an identifier for an owner of the session that facilitates channeling results generated by the selected group of people in taking the quiz to the owner of the session.

A variation on the above embodiment includes a result store for storing results generated by the selected group of people taking the quiz.

A variation on the above embodiment includes a session identifier that identifies the session.

In a variation on the above embodiment, the quiz store includes copies of questions and answers that make up the quiz. In another variation, the quiz store includes a reference to a location where the questions and answers for the quiz are stored.

One embodiment of the present invention provides a graphical interface within a computer system for providing a session for a quiz. This quiz may be associated with a plurality of different sessions owned by a plurality of different session owners. The graphical interface includes a first display for creating the session for the quiz to facilitate channeling results generated by a selected group of people in taking the quiz to an owner of the session. This first display allows the owner of the session to select the quiz to be associated with the session. The graphical interface also includes a second display through which the selected group of people are allowed to take the quiz. The graphical interface additionally includes a third display that allows the owner of the session to view results generated by the selected group of people in taking the quiz.

In a variation on the above embodiment, the second display is associated with a mechanism that stores the results generated by the selected group of people in taking the quiz to a file. In another variation, the second display is associated with a mechanism that communicates the results generated by the selected group of people in taking the quiz to the third display.

In a variation on the above embodiment, third display outputs summary statistics for the results.

One embodiment of the present invention includes a system that provides a session for a quiz on a computer system. The system operates by receiving a request to take a quiz from a student. This request includes a session identifier and an identifier for the owner of the session. The system also receives the results from the student in taking the quiz. If the session has not been previously created, the system creates the session for the quiz, and associates the session with the owner of the session to facilitate channeling results generated by a selected group of people in taking the quiz to the owner of the session. Next, the system communicates the results to the owner of the session.

BRIEF DESCRIPTION OF THE FIGURES

FIG. 4 is a flow chart illustrating how an educator creates a session for a quiz in accordance with an embodiment of the present invention.

FIG. 5 is a flow chart illustrating how a student accesses a session for a quiz in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer Systems

Figure 1:
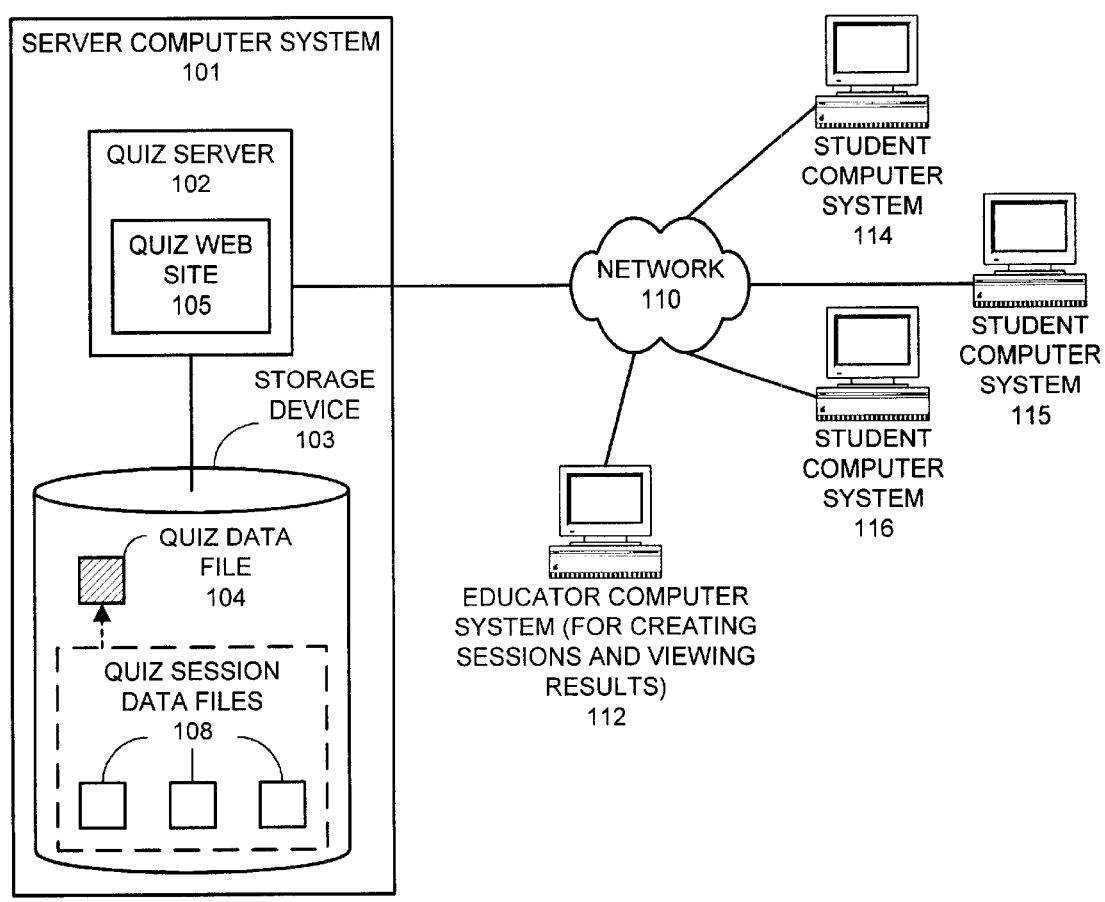
FIG. 1 illustrates a number of computer systems coupled together by a network in accordance with an embodiment of the present invention.

FIG. 1 illustrates a number of computer systems coupled together by a network 110 in accordance with an embodiment of the present invention. The computer systems include server computer system 101, educator computer system 112 and student computer systems 114–116. Network 110 may include any type of wire or wireless link between computers including, but not limited to, a local area network, a wide area network, or a combination of networks. In one embodiment of the present invention, network 110 includes the Internet.

Server computer system 101 may include any node on network 110 including computational capability and data storage capability, as well as a mechanism for servicing requests from clients for computational and data storage resources.

Educator computer system 112 and student computer systems 114–116 may include any node on a network including computational capability and including a mechanism for communicating across the network. In the embodiment of the present invention illustrated in FIG. 1, educator computer system 112 and student computer systems 114–116 act as clients for server computer system 101. In general, educator computer system 112 communicates with server computer system 101 to enable an educator to create a session for a quiz and to review results generated by students in taking the session. Correspondingly, student computer systems 114–116 communicate with server computer system 101 to enable students to take quiz sessions. Note that the term educator can generally refer to a teacher or any other person who is in charge of administering a quiz session.

Server computer system 101 includes quiz server 102 and storage device 103. Quiz server 102 includes resources that implement quiz web site 105. Quiz web site 105 provides resources that allow an educator operating on educator computer system 112 to create a quiz session and to view results of the quiz session through a web browser on educator computer system 112. Quiz web site 105 also provides resources that enable students on student computer systems 114–116 to take a quiz session via web browsers on student computer systems 114–116.

Note that although the present invention is described in terms of a web site 105 on a server computer system 101 and web browsers on client computer systems 112 and 114–116, the present invention can generally be implemented on any computer system that can be remotely accessed. Hence, the present invention is not limited to systems designed around web sites or client-server systems.

Storage device 103 may include any type of storage device for storing code and/or data in for access by quiz server 102. For example, storage device 103 may include a disk drive or a semiconductor memory. Storage device 103 includes quiz data files 104. Quiz data files 104 include data associated with a specific quiz. Note that the specific quiz can be associated with a number of different sessions, and these sessions have their own data files. Hence, quiz data files 104 for a specific quiz can be associated with session data files 108 for a number of different sessions.

During operation, the system illustrated in FIG. 1 operates generally as follows. An educator operating on educator computer system 112 creates a session for a quiz from by accessing quiz web site 105 on server computer system 101. This involves first identifying an existing quiz and creating a session for the quiz. (Also note that quiz web site 105 allows an educator to create a quiz.) Next, a number of students take the session for the quiz by accessing quiz web site 105 through student computer systems 114–116. In doing so, the students are able to review their results from the quiz. After all of the students have taken the quiz, the educator can view results of the quiz from educator computer system 112.

Web Site

Figure 2:
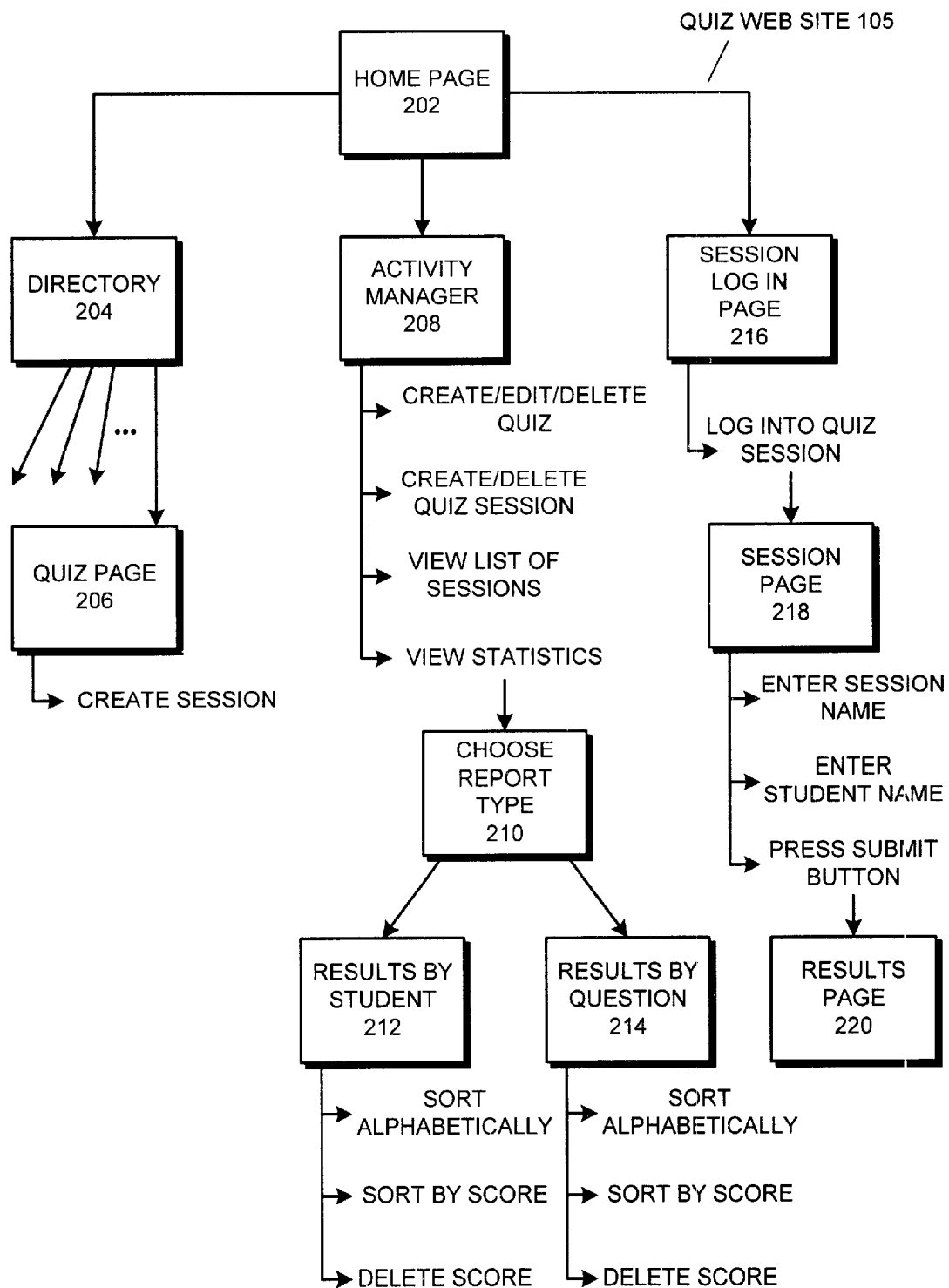
FIG. 2 illustrates the structure of a web site for administering and taking quizzes in accordance with an embodiment of the present invention.

FIG. 2 illustrates the structure of quiz web site 105 (from FIG. 1) for administering and taking quizzes in accordance with an embodiment of the present invention. Users typically enter quiz web site 105 through home page 202, which is accessible through a link on the Internet. Home page 202 includes instructions on how to use quiz web site 105 as well as access points that allow a user to access other pages within quiz web site 105, including directory 204, activity manager 208 and session login page 216.

Directory 204 includes a directory of the quizzes that are available on quiz web site 105. This allows a user to navigate through the quizzes on quiz web site 105 in order to find a desired quiz. Note that directory 204 can be organized hierarchically so that quizzes can be viewed by category and subcategory. In general any type of access structure for viewing quizzes can be used to implement directory 204. In FIG. 2, directory 204 references quiz page 206.

Quiz page 206 allows an educator to view an associated quiz. One of the command options on quiz page 206 allows an educator to create a session for a quiz. Once the session is created, the educator can allow a selected group of students to take the session for the quiz. The results generated by the students in taking the session of the quiz can then be viewed by the instructor. Hence, a session allows a number of different educators to give the same quiz to a number of different groups of students without the results from the different groups of students becoming intermixed.

Educators typically access quiz web site 105 through activity manager 208. Activity manager 208 is password protected for each educator and can be customized for each educator. Activity manager 208 allows an educator to perform a number of functions related to sessions and quizzes. A first set of command options allows the educator to create, edit and delete a quiz. A second set of command options allows the educator to create, edit and delete quiz sessions. A third set of command options allows the educator to view a list of quiz sessions that the educator has created. A fourth set of command options allows the educator to view results from students taking quiz sessions.

In order to view statistics, the educator must first choose a report type (box 210). The educator is then presented with results organized by students 212 or results organized by questions 214 depending upon which type of report is chosen. The educator can then perform a number of functions within each type of report, such as sorting alphabetically, sorting by score or deleting a particular score.

Session login page 216 allows a student to log in to a specified session. Typically, the student receives a session identifier from the educator, and the student uses the session identifier to access the session.

Once the student logs into the session, the student is presented with a session page 218. Session page 218 allows the student to enter his or her name or some other form of identification. Session page 218 then presents questions to the student and allows the student to answer the questions. When the questions are answered, the student presses a submit button within session page 218. The student is then presented with a results page 220. Results page 220 allows the student to view the results of the quiz session including the correct answers to questions that were answered incorrectly.

Note that many other possible organizations for a quiz web site 105 can be used with the present invention. Also note that in one embodiment of the present invention, quiz web site 105 includes mechanisms to implement other computer-based instructional games in addition to quizzes.

Files

Figure 3A:
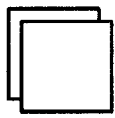
FIG. 3A illustrates files associated with a quiz in accordance with an embodiment of the present invention.
Figure 3A:
Figure 3A:
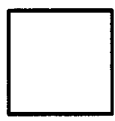
Figure 3A:
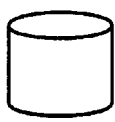

FIG. 3A illustrates files associated with a quiz in accordance with an embodiment of the present invention. These quiz files include HTML files, which contain data specifying the visual presentation of quiz data. The HTML files may include presentation commands in HyperText Markup Language (HTML) as well as embedded applets written in the Java programming language. Note that HTML files specify the format for a quiz page as well as the format for a results page. The quiz files also include a data file, which contains the questions and answers associated with the quiz.

A settings file is also associated with the quiz. The settings file includes the name of the quiz, a description of the quiz, and any other settings that may be associated with the quiz.

The quiz is also associated with a database record that includes an identification number that can be used to reference the quiz as well as the title and author of the quiz. This database record allows the quiz to be indexed by title, by author, or by any other index associated with the database record.

Figure 3B:
FIG. 3B illustrates files associated with a session for a quiz in accordance with an embodiment of the present invention.
Figure 3B:
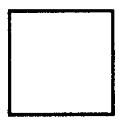
Figure 3B:
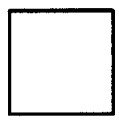
Figure 3B:
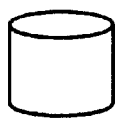

FIG. 3B illustrates files associated with a session for a quiz in accordance with an embodiment of the present invention. These session files include a data file, which is a snapshot of the corresponding quiz data file at a particular instant in time. Note that the quiz data file may change over time as the quiz owner modifies the quiz. Hence, by copying the data files for the quiz to form the quiz session, the system ensures that the questions and answers for the quiz session do not change over time.

A settings file includes a number of settings for the session, such as the name of the session, the name of the author/owner of the session and the type of feedback that will be generated for the session.

The results file stores results from students taking the session. Note that the results file is initially empty.

The session is also associated with a database record that includes an identification number that can be used to reference the session as well as the title and author of the session. This database record allows the session to be indexed by title, by author or by any other index associated with the database record.

Note that the above-described quiz files and session files can be organized in a number of different ways. They can reside in a single file, in multiple files, in database records or in any other structure that can store the information.

Process of Creating a Session

FIG. 4 is a flow chart illustrating how an educator creates a session for a quiz in accordance with an embodiment of the present invention. The system first allows an educator to locate a quiz. This can be done by allowing the educator to browse through directory 204 (in FIG. 2) to locate the quiz (step 402). Next, the system retrieves the files associated with the quiz and presents the educator with quiz page 206 (step 404). Within quiz page 206, the system can receive a request to create a session for the quiz from the educator (step 406). In response to the request, the system requests and receives settings for the session, such as the name of the author/owner of the session and the name of the session (step 408). If the name of the session is already taken, the system asks for a different name (see loop associated with step 408).

Next, the system makes a copy of the quiz files (step 410), which may include the quiz data files and associated setting information. The system also makes an entry for the session in the database (step 411). Note that this entry can include information that associates the session with the educator. Finally, the system stores the session information into the files and the database entry described previously with reference to FIG. 3B above (step 412).

Process of Accessing a Session to Take a Quiz

FIG. 5 is a flow chart illustrating how a student accesses a session to take a quiz in accordance with an embodiment of the present invention. The system first allows the student to log in to a session from session login page 216 (step 502). The student can do so by typing in a unique identifier for the session into session login page 216. The system next retrieves the session information from the files described with reference to FIG. 3B (step 504).

This session information is used to present session page 218 to the student (step 505). Within session page 218, the system requests and receives the student's name or some other identifier for the student (step 506). The system also presents the questions that comprise the quiz to the student (step 508). In response to the questions, the system receives answers from the student (step 510).

Next, the system generates feedback for the student (step 512). The system also stores the student's answers (step 514) and displays the feedback to the student (step 516). Note that this feedback may include the correct answers for incorrectly answered questions as well as the student's overall score for the quiz.

Process of Viewing Results of a Quiz Session

Figure 6:
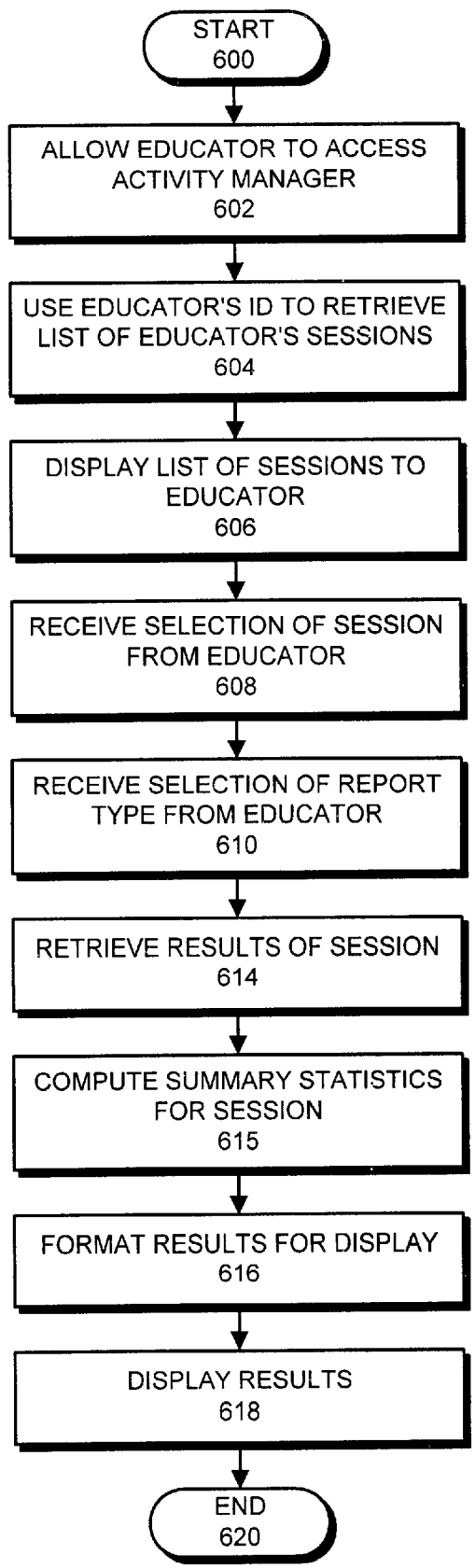
FIG. 6 is a flow chart illustrating how an educator views results from students taking a session of a quiz in accordance with an embodiment of the present invention.

FIG. 6 is a flow chart illustrating how an educator views results from students taking a session of the quiz in accordance with an embodiment of the present invention. The system starts by allowing the educator to access activity manager 208 from FIG. 2 (step 602). Activity manager 208 uses the educator's identifier to retrieve a list of sessions that were created by the educator (step 604). This retrieval may involve a database query to locate all sessions owned by the educator. This list of sessions is displayed to the educator (step 606). The system next receives a selection of a session to view from the educator (step 608) and receives a selection for a report type (step 610).

In response to these inputs, the system retrieves results from the results file for the session (step 614) and computes summary statistics for the session (step 615). These summary statistics can include numbers, such as average scores for the session and statistical distributions of scores for the session. Next, the results and summary statistics are formatted for display (step 616) and the results are displayed in a report form (step 618). Note that the educator can perform operations on the results, such as sorting the results alphabetically or sorting the results by score. The educator can also delete scores.

Process of Creating a Session Dynamically

Figure 7:
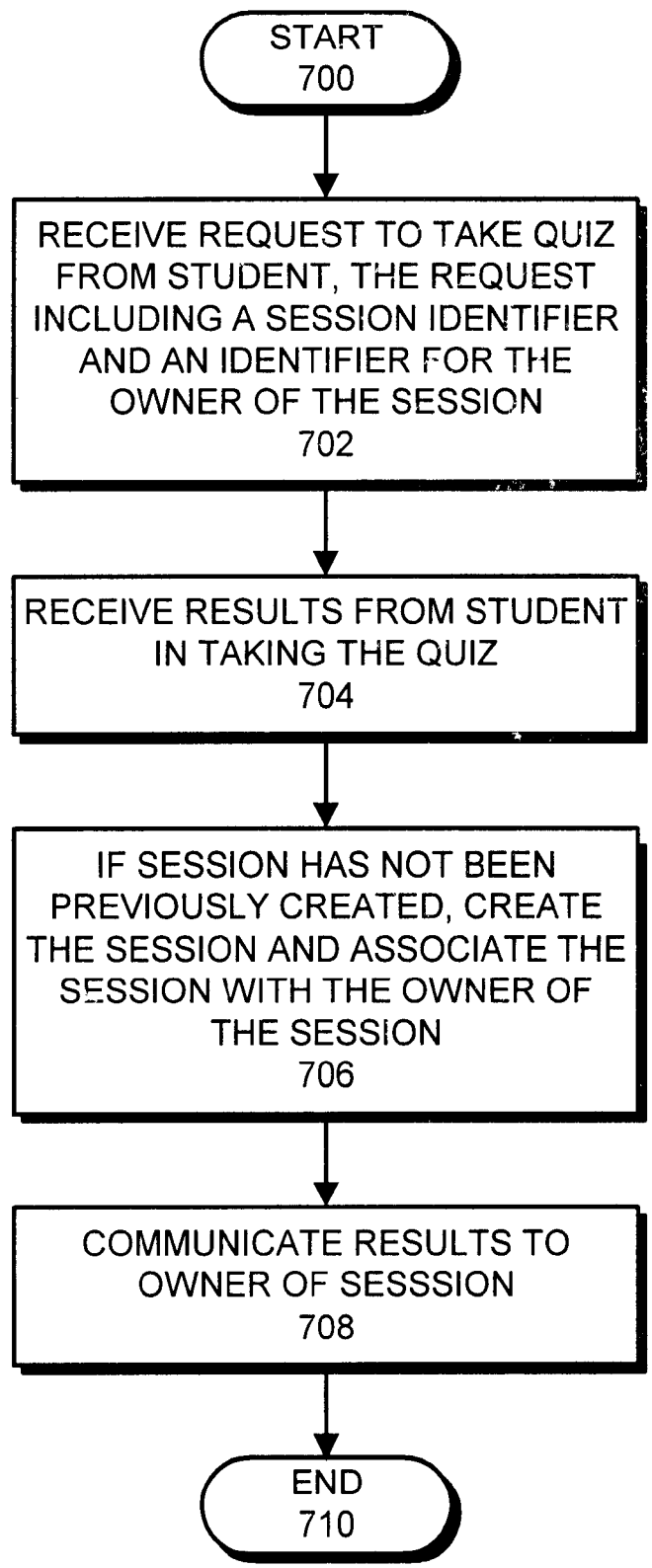
FIG. 7 is a flow chart illustrating how a session is created in accordance with another embodiment of the present invention.

FIG. 7 is a flow chart illustrating how a session is created dynamically in accordance with another embodiment of the present invention. In this embodiment, a session is not created until a student first requests and takes the quiz.

For example, suppose an educator decides to give a quiz session to two groups of students. Also suppose the educator's ID is "jones" and she is using an underlying quiz with the ID "1234". She decides to call her sessions "A" and "B". (At this point, the session names are in the educator's mind only-she hasn't created anything).

The first group of students arrives in the computer lab. These students go to the session login screen and enter the quiz ID ("1234"). They press submit and are given a page with the questions for that quiz. At the top of the page are three fields: "instructor ID", "session name", and "student name". There is also a hidden field quizID pre-populated with "1234". For the instructor ID the students all enter "jones", and for session name, they all enter "A". After answering all of the questions, the students press submit. Upon receiving the first set of results containing the combination jones/1234/A, the system creates a new session, including a database entry and a results file. As more results come in with the jones/1234/A combination, the results file gets populated with additional records.

Next, the second group of students arrives in the computer lab. They follow their instructor's instructions and enter "B" as the session name. When the system receives the first jones/1234/B entry, it creates a new session.

Later, the educator goes to activity manager 208 and sees entries for sessions named "A" and "B". At this point, she can view statistics, delete the sessions, etc.

Referring to the flow chart in FIG. 7, the system first receives a request to take the quiz from a student (step 702). This request includes a session identifier and an identifier for the owner of the session. The system also receives results from the student in taking the session (step 704). If the session has not been previously created, the system creates the session and associates the session with the owner of the session (step 706). Next, results are communicated to the owner of the session (step 708).

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for providing a session for a quiz on a computer system, comprising:

receiving a request to create the session for the quiz, wherein the quiz is associated with a plurality of different sessions owned by a plurality of different session owners;

creating the session for the quiz, the session providing a mechanism through which a selected group of people take the quiz;

associating the session with an owner of the session to facilitate channeling results generated by the-selected-group of people in taking the quiz to the owner of the session;

making the session for the quiz available over a network so that the selected group of people can take the quiz from remote nodes on the network;

receiving the results from the selected group of people taking the quiz from the remote nodes on the network; and communicating the results to the owner of the session;

whereby the plurality of different sessions allows each of the plurality of different session owners to give the quiz to multiple different groups of people without results from each of the multiple different groups of people becoming intermixed.

2. The method of claim 1, wherein the owner of the session for the quiz is an educator, and the selected group of people are students of the educator.

3. The method of claim 1, wherein communicating the results to the owner of the session includes storing the results in a file that can be accessed by the owner of the session.

4. The method of claim 1, wherein communicating the results to the owner of the session includes sending the results over the network to the owner of the session.

5. The method of claim 1, wherein communicating the results to the owner of the session further comprises computing summary statistics for the results and formatting the results for display.

6. The method of claim 1, wherein creating the session for the quiz includes copying questions and answers for the quiz.

7. The method of claim 1, wherein the network includes the Internet.

8. The method of claim 1, wherein making the session for the quiz available over the network includes making the session for the quiz available on a web site.

9. A method for providing a session for a quiz on a computer system, comprising:

receiving a request to create the session for the quiz from an educator, wherein the quiz is associated with a plurality of different sessions owned by a plurality of educators;

creating the session for the quiz, the session providing a mechanism through which students of the educator take the quiz;

associating the session with the educator to facilitate channeling results generated by the students in taking the quiz to the educator;

making the session for the quiz available over a network so that the students can take the quiz from remote nodes on the network;

receiving the results from the students taking the quiz from the remote nodes on the network;

storing the results in a form that can be accessed by the educator;

computing summary statistics for the results; and formatting the results for viewing, whereby the plurality of different sessions allows each of the plurality of educators to give the quiz to multiple different groups of students without results from each of the multiple different groups of students becoming intermixed.

10. The method of claim 9, wherein the quiz may be associated with a plurality of different sessions owned by a plurality of different session owners.

11. The method of claim 9, wherein creating the session for the quiz includes copying questions and answers for the quiz.

12. The method of claim 9, wherein making the session for the quiz available over the network includes making the session for the quiz available on a web site on the Internet.

13. A computer system that provides a session for a quiz, comprising:

a server on a network;

an input mechanism within the server that receives a request to create the session for the quiz, wherein the quiz is associated with a plurality of different sessions owned by a plurality of different session owners;

a session creation mechanism within the server that is configured to, create the session for the quiz, the session providing a mechanism through which a selected group of people take the quiz, and to associate the session with an owner of the session to facilitate channeling results generated by the selected group of people in taking the quiz to the owner of the session;

a session providing mechanism within the server that is configured to, make the session for the quiz available over the network so that the selected group of people can take the quiz from remote nodes on the network, and to receive the results from the selected group of people taking the quiz from the remote nodes on the network; and a communication mechanism within the server that communicates the results to the owner of the session, whereby the plurality of different sessions allows each of the plurality of different session owners to give the quiz to multifle different groups of people without results from each of the multiple different groups of people becoming intermixed.

14. The computer system of claim 13, wherein the owner of the session for the quiz is an educator, an the selected group of people are students of the educator.

15. The computer system of claim 13, wherein the communication mechanism is configured to store the results in a file that can be accessed by the owner of the session.

16. The computer system of claim 13, wherein the communication mechanism is configured to send the results over the network to the owner of the session.

17. The computer system of claim 13, wherein the communication mechanism is further configured to compute summary statistics for the results and to format the results for display.

18. The computer system of claim 13, wherein the session creation mechanism is configured to copy questions and answers for the quiz.

19. The computer system of claim 13, wherein the session providing mechanism is configured to make the session for the quiz available on a web site on the Internet.

20. A computer readable storage medium storing instructions that when executed by a computer cause the computer to perform a method for providing a session for a quiz on a computer system, comprising:

receiving a request to create the session for the quiz, wherein the quiz is associated with a plurality of different sessions owned by a plurality of different session owners;

creating the session for the quiz, the session providing a mechanism through which a selected group of people take the quiz;

associating the session with an owner of the session to facilitate channeling results generated by the selected group of people in taking the quiz to the owner of the session;

making the session for the quiz available over a network so that the selected group of people can take the quiz from remote nodes on the network;

receiving the results from the selected group of people taking the quiz from the remote nodes on the network; and communicating the results to the owner of the session, whereby the plurality of different sessions allows each of the plurality of different session owners to give the quiz to multiple different groups of people without results from each of the multiple different groups of people becoming intermixed.

21. A data structure encoded on a computer readable storage medium for providing a session for a quiz on a computer system, wherein, the quiz is associated with a plurality of different sessions owned by a plurality of different session owners, comprising:

a quiz store for storing data that facilitates retrieving questions and answers that make up the quiz; and an access structure for the session that allows a selected group of people to access the session; and an identifier for an owner of the session that facilitates channeling results generated by the selected group of people in taking the quiz to the owner of the session, whereby the plurality of different sessions allows each of the plurality of different session owners to give the quiz to multiple different groups of people without results from each of the multiple different groups of people becoming intermixed.

22. The data structure encoded on a computer readable storage medium of claim 21, further comprising a result store for storing results generated by the selected group of people taking the quiz.

23. The data structure encoded on a computer readable storage medium of claim 21, further comprising a session identifier that identifies the session.

24. The data structure encoded on a computer readable storage medium of claim 21, wherein the quiz store includes copies of questions and answers that make up the quiz.

25. The data structure encoded on a computer readable storage medium of claim 21, wherein the quiz store includes a reference to a location where questions and answers for the quiz are stored.

26. A graphical interface within a computer system for providing a session for a quiz, comprising:
    a first display for creating the session for the quiz to facilitate channeling results generated by a selected group of people in taking the quiz to an owner of the session, wherein the quiz may be associated with a plurality of different sessions owned by a plurality of different session owners;
    wherein the first display allows the owner of the session to select the quiz to be associated with the session;
    wherein the quiz is associated with a plurality of different sessions owned by a plurality of different session owners;
    a second display through which a selected group of people are allowed to take quiz; and
    a third display that allows the owner of the session to view results generated by the selected group of people in taking the quiz, whereby the plurality of different session allows the plurality of each of the different session owners to give the quiz to multiple different groups of people without results from each of the multiple different groups of people becoming intermixed.

27. The graphical interface of claim 26, wherein the owner of the session for the quiz is an educator, and the selected group of people are students of the educator.

28. The graphical interface of claim 26, wherein the second display is associated with a mechanism that stores the results generated by the selected group of people in taking the quiz to a file.

29. The graphical interface of claim 26, wherein the second display is associated with a mechanism that communicates the results generated by the selected group of people in taking the quiz to the third display.

30. The graphical interface of claim 26, wherein the third display outputs summary statistics for the results.

31. The graphical interface of claim 26, wherein the first display triggers a mechanism that creates the session for the quiz by copying questions and answers that make up the quiz.

32. The graphical interface of claim 26, wherein the graphical interface is part of a web site accessible through the Internet.

33. A method for providing a session for a quiz on a computer system, comprising:
    receiving a request to take a quiz from a student, the request including a session identifier and an identifier for the owner of the session, wherein the quiz is associated with a plurality of different sessions owned by a plurality of different session owners;
    if the session has not been previously created, creating the session for the quiz, the session providing a mechanism through which a selected group of people take the quiz, and associating the session with the owner of the session to facilitate channeling results generated by the selected group of people in taking the quiz to the owner of the session; and
    communicating the results from the student in taking the quiz to the owner of the session, whereby the plurality of different sessions allows each of the plurality of different session owners to give the quiz to multiple different groups of people without results from each of the multiple different groups of people becoming intermixed.

* * * * *